(12) United States Patent
Groff et al.

(10) Patent No.: US 7,669,218 B1
(45) Date of Patent: Feb. 23, 2010

(54) PROVISION OF ELECTRONIC MAIL SERVICES VIA A CABLE SERVICES NETWORK

(75) Inventors: Vincent Groff, Dunwoody, GA (US); Steve Calzone, Duluth, GA (US); John Kelly King, Asheville, NC (US); Bruce Beeco, Buford, GA (US)

(73) Assignee: Cox Communications, Inc., Atlanta, GA (US)

( * ) Notice: Subject to any disclaimer, the term of this patent is extended or adjusted under 35 U.S.C. 154(b) by 1489 days.

(21) Appl. No.: 10/885,295

(22) Filed: Jul. 2, 2004

(51) Int. Cl.
*H04N 5/445* (2006.01)
*G06F 13/00* (2006.01)
*G06F 30/00* (2006.01)

(52) U.S. Cl. .............................. 725/50; 725/34; 725/39; 725/51; 713/168

(58) Field of Classification Search .................... 725/34, 725/39, 50, 51; 713/168
See application file for complete search history.

(56) References Cited

U.S. PATENT DOCUMENTS 6,388,714 B1 * 5/2002 Schein et al. ............... 348/563
2005/0050324 A1 * 3/2005 Corbett et al. .............. 713/168

* cited by examiner

*Primary Examiner*—Hunter B. Lonsberry
(74) *Attorney, Agent, or Firm*—Merchant & Gould

(57) ABSTRACT

Methods and systems are provided for accessing electronic mail services via a cable services network. A cable television services customer/user may access electronic mail services through a cable television services provider by providing access credentials via an interactive television session through a cable television set-top box. To authenticate a customer/user's access to electronic mail services, a username and a personal identification number (PIN) are submitted by the customer/user to a backend database. A password for the customer/user is located in the backend database and is utilized for accessing the electronic mail services by the customer/user. If the customer/user has never established a personal identification number, the customer/user may submit a new PIN to the backend database. Authorization to enter the new PIN into the backend database is based on submission of a valid username and password by the customer/user.

31 Claims, 10 Drawing Sheets

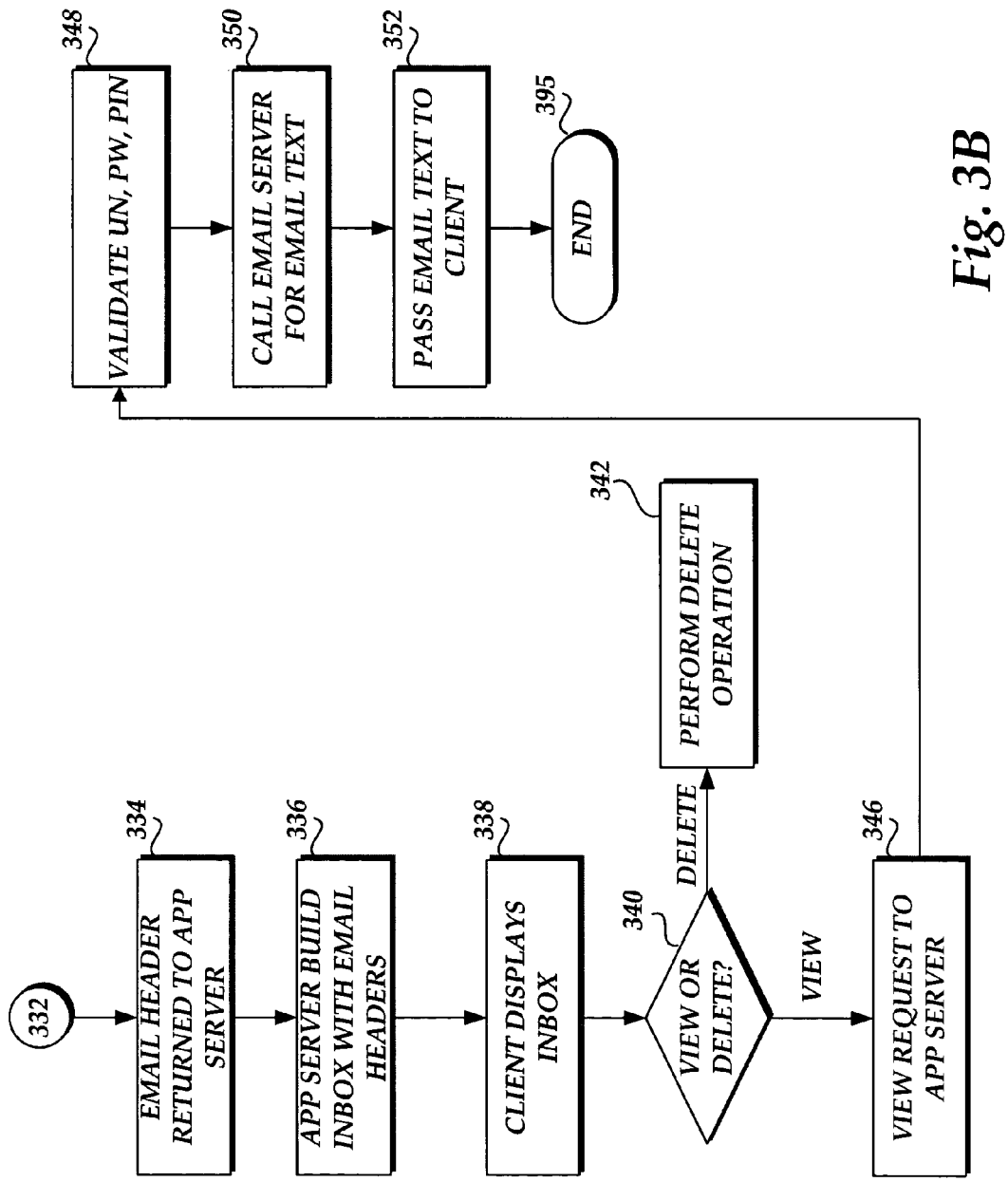

PROVISION OF ELECTRONIC MAIL SERVICES VIA A CABLE SERVICES NETWORK

FIELD OF THE INVENTION

The present invention generally relates to provision of electronic mail services via a cable services network. More particularly, the present invention relates to authorization and authentication of user access to electronic mail services via a cable services network.

BACKGROUND OF THE INVENTION

With the advent of cable television networks, cable customers have grown accustomed to receiving a variety of television programming from numerous broadcasting sources. In recent years, technology advances have enabled customers to receive an even greater variety of services through cable services networks. Modern cable services networks provide traditional video television programming, telephone services, high-speed Internet access, electronic mail services, video-on-demand, information services, and the like. Through the use of set-top boxes (computing systems) cable services providers can provide interactive television services to customers. Such interactive television services allow customers to interact directly with services providers in response to services and product offerings presented to the customers through their personal television sets.

For provision of electronic mail services, a cable customer may view electronic mail messages on the customer's local television screen via an interactive television session. The customer's set-top box typically serves as a client-side computing device for displaying electronic mail messages to the customer's television screen. Typically, electronic mail messages are received and stored at a backend electronic mail server. The customer accesses the electronic mail server from the customer's set-top box via the cable services network. In order to prevent unauthorized users from gaining access to a given customer's electronic mail messages, an authorization and authentication process is typically employed to verify a customer's authorized access to electronic mail files.

In typical electronic mail environments, an electronic mail user must provide credentials such as a username and password to gain access to electronic mail files. However, because most cable customers interact with their television sets through remote control devices, entry of such credentials is difficult. Prior systems sometimes utilize soft keyboards presented on television screens with which a user may slowly and tediously enter credentials such as usernames and passwords. Other systems cause remote control device keys to act as modified keyboards for entry of credentials. With such systems, entry of electronic mail access credentials is cumbersome, time consuming and error prone.

Accordingly, there is a need for an improved method and system for provision of electronic mail services via a cable services network. There is further a need for an improved method and system for interactively providing electronic mail system access credentials via a cable services network interactive television session. It is with respect to these and other considerations that the present invention has been made.

SUMMARY OF THE INVENTION

Embodiments of the present invention solve the above and other problems by providing improved methods and systems for accessing electronic mail services via a cable services network. According to an interactive television system of the present invention, a cable television services customer may interact with services providers through her personal television set via a set-top box. The set-top box controls and facilitates the presentation of video programming and data to the customer's television set. Additionally, the set-top box serves as a client side computing platform for allowing the customer to send and receive data to and from a server-side computing system operated by the customer's interactive television services provider.

According to an aspect of the invention, a cable television services customer may access electronic mail services through the customer's cable television services provider by providing access credentials via an interactive television session through the customer's cable television set-top box. Upon selection of electronic mail services from a menu of services, a determination is made as to whether the customer is an electronic mail services customer. If the customer is an electronic mail services customer, an electronic mail services login page is displayed to the customer on the customer's television display screen by the customer's set-top box.

With the customer's remote control device, the customer may select her username from one or more usernames associated with the set-top box. The customer may then enter a personal identification number using the number keys on the customer's remote control device. The username and personal identification number (PIN) are submitted from the client side set-top box to a backend application server via the cable services network. The application server passes the customer's username to a web services system to request a password for accessing an electronic mail system for the customer's electronic mail messages. The web services system passes a database query to a lightweight directory access protocol (LDAP) database. At the LDAP database, the username is utilized to obtain data for the customer including a username, password and personal identification number for the customer.

The username, password and PIN for the customer are passed to the application server via the web services system. At the application server, the PIN received from the LDAP database is compared with the PIN submitted by the customer. If the two PINs match, the password received from the LDAP database is utilized by the application server to access the electronic mail system to obtain electronic mail messages received by the customer. The application server first obtains electronic mail header information associated with the electronic mail messages received by the customer. The application server builds an inbox page with the header information and passes the inbox page to the client side set-top box for display to the customer on the customer's television display screen. Alternatively, the application server may send data representing the header information to the set-top box, and the set-top box may build and display the inbox page.

If the customer chooses to view a given message displayed in the inbox, a view request is sent to the application server. After the customer is again authenticated for access to the electronic mail system, electronic mail text for the selected message is obtained by the application server and is sent to the set-top box for display on the customer's television display screen. If the customer chooses to delete a selected electronic mail message, a delete mail request is sent to the application server. The application server accesses the electronic mail system with the customer's verified access credentials and deletes the selected email message.

According to another aspect of the invention, if the customer has never set up a personal identification number, a PIN setup page may be launched for submission of a new PIN. The customer enters a username, password and a new PIN. The username, the password and the new PIN entered by the customer are passed to the application server by the client side set-top box. The application server passes the username to the LDAP database via the web services system. At the LDAP database, a username and password associated with the username from the application server are found and are returned to the application server via the web services system. If the username and password received from the customer at the application server matches the username and password received from the LDAP database, the new PIN submitted by the customer is passed to the LDAP database by the application server via the web services system. The LDAP database stores the new PIN for the customer for subsequent use for authorizing and authenticating access to the electronic mail system by the customer.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

BRIEF DESCRIPTION OF THE DRAWINGS

FIGS. 3A and 3B are flow diagrams showing an illustrative routine for accessing an electronic mail system via a cable services network according to embodiments of the present invention.

DETAILED DESCRIPTION

Figure 1:
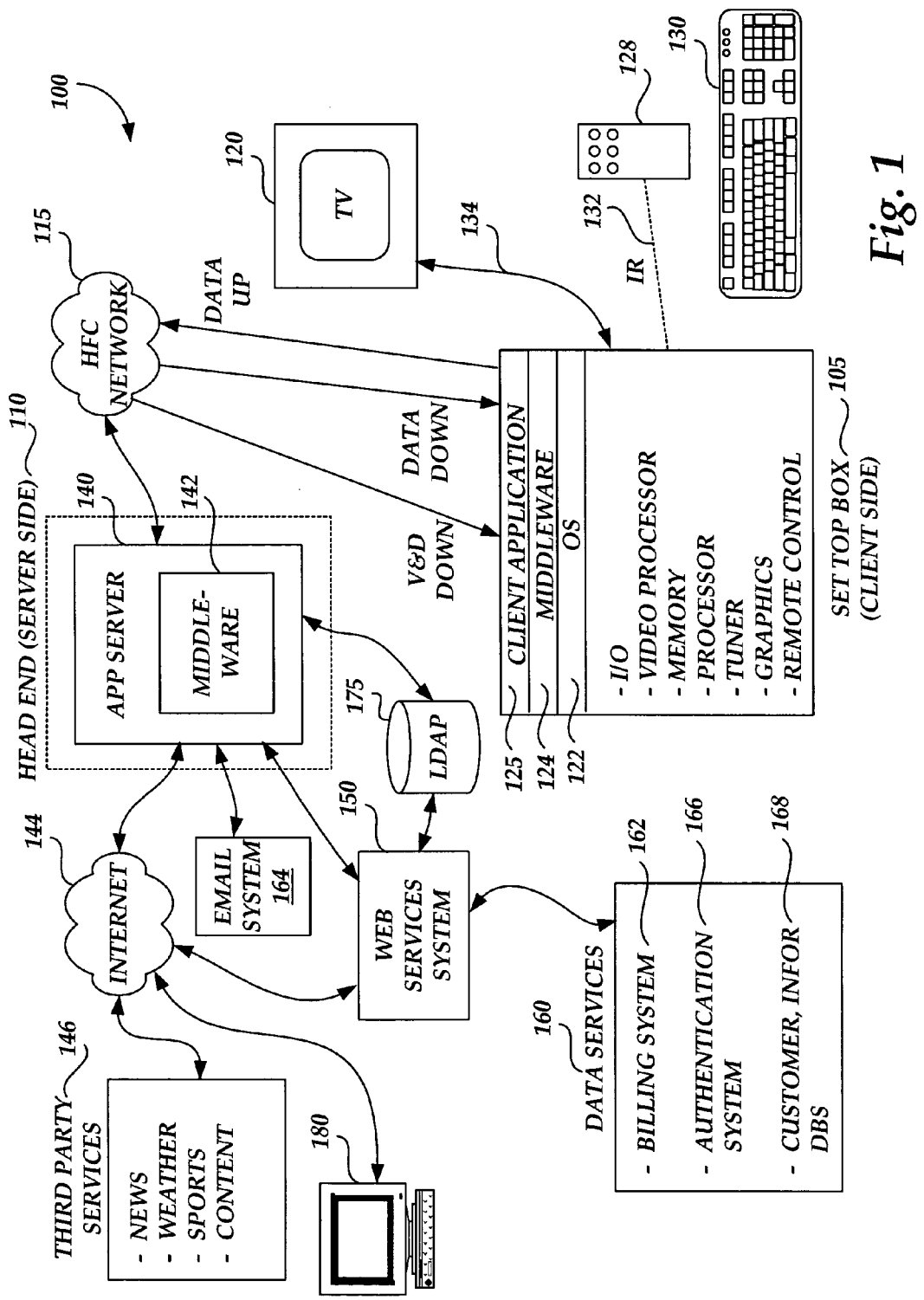
FIG. 1 is a simplified block diagram illustrating a cable services network architecture that serves as an exemplary operating environment for the present invention.

As briefly described above, embodiments of the present invention are directed to improved methods and systems for providing electronic mail services in a cable services network. Embodiments of the present invention provide for improved methods and systems for providing customer authorization and authentication credentials to an electronic mail system via an interactive television session through a cable services network. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents. Referring now to the drawings, in which like numerals refer to like elements throughout the several figures, aspects of the present invention and an exemplary operating environment will be described.

Operating Environment

Embodiments of the present invention may be implemented in a number of distributed computing environments where functionality may be provided from disparate communicating computing and telecommunications systems. According to an actual embodiment, the present invention is implemented in a cable television/services system. FIG. 1 is a simplified block diagram illustrating a cable television/services system (hereafter referred to as "CATV") architecture that serves as an exemplary operating environment for the present invention.

Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer. According to embodiments of the present invention, the functionality of the HFC network 115 allows for efficient bidirectional data flow between the client side set-top box 105 and the server-side application server 140 of the present invention.

According to embodiments of the present invention, the CATV system 100 is in the form of a distributed client-server computing system for providing video and data flow across the HFC network 115 between server-side services providers (e.g., cable television/services providers) via a server-side head end 110 and a client side customer via a client side set-top box (STB) functionally connected to a customer receiving device, such as the television set 120. As is understood by those skilled in the art, modern CATV systems 100 may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory and an input/output mechanism. The input/output mechanism receives input from server-side processes via the HFC network 115 and from customers via input devices such as the remote control device 128 and the keyboard 130. The remote control device 128 and the keyboard 130 may communicate with the STB 105 via a suitable communication transport such as the infrared connection 132. The STB 105 also includes a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 125. For example, if a client application 125 requires a news flash from a third-party news source to be displayed on the television 120, the operating system 122 may cause the graphics functionality and video processor of the STB 105, for example, to output the news flash to the television 120 at the direction of the client application 126 responsible for displaying news items. According to embodiments of the present invention, a client application 125 is provided having sufficient computer-executable instructions for displaying electronic mail data to the television 120 and for processing electronic mail system commands to and from the set-top box 105 via the operating system 122.

Because a variety of different operating systems 122 may be utilized by a variety of different brands and types of set-top boxes, a middleware layer 124 is provided to allow a given software application to be executed by a variety of different operating systems. According to an embodiment of the present invention, the middleware layer 124 may include a set of application programming interfaces (API) that are exposed to client applications 126 and operating systems 122 that allow the client applications to communicate with the operating systems through common data calls understood via the API set. As described below, a corresponding middleware layer is included on the server side of the CATV system 100 for facilitating communication between the server-side application server and the client side STB 105. According to one embodiment of the present invention, the middleware layer 142 of the server-side application server and the middleware layer 124 of the client side STB 105 format data passed between the client side and server side according to the Extensible Markup Language (XML).

The set-top box 105 passes digital and analog video and data signaling to the television 120 via a one-way communication transport 134. The STB 105 may receive video and data from the server side of the CATV system 100 via the HFC network 115 through a video/data downlink and data via a data downlink. The STB 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the STB 105 and for distribution to the television set 120. As is understood by those skilled in the art, the "in band" signaling space operates at a frequency between 54 and 860 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 1, between the HFC network 115 and the set-top box 105 comprise "out of band" data links. As is understand by those skilled in the art, the "out of band" frequency range generally lies between zero and 54 megahertz. According to embodiments of the present invention, data flow between the client side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the HFC network 115 to client side STBs 105 for presentation to customers via televisions 120. As described above, a number of services may be provided by the CATV system 100, including digital and analog video programming, interactive television services, telephone services, video-on-demand services, targeted advertising, and provision of information content.

The application server 140 is a general-purpose computing system operative to assemble and manage data sent to and received from the client side set-top box 105 via the HFC network 115. As described above with reference to the set-top box 105, the application server 140 includes a middleware layer 142 for processing and preparing data from the head end of the CATV system 100 for receipt and use by the client side set-top box 105. For example, the application server 140 via the middleware layer 142 may obtain data from third-party services 146 via the Internet 140 for transmitting to a customer through the HFC network 115 and the set-top box 105. For example, a weather report from a third-party weather service may be downloaded by the application server via the Internet 144. When the application server 140 receives the downloaded weather report, the middleware layer 142 may be utilized to format the weather report for receipt and use by the set-top box 105. According to one embodiment of the present invention, data obtained and managed by the middleware layer 142 of the application server 140 is formatted according to the Extensible Markup Language and is passed to the set-top box 105 through the HFC network 115 where the XML-formatted data may be utilized by a client application 125 in concert with the middleware layer 124, as described above. As should be appreciated by those skilled in the art, a variety of third-party services data, including news data, weather data, sports data and other information content may be obtained by the application server 140 via distributed computing environments such as the Internet 144 for provision to customers via the HFC network 115 and the set-top box 105.

According to embodiments of the present invention, the application server 140 may communicate with and exchange data with a number of distributed computing and data systems. As illustrated in FIG. 1, the services provider data services 160 include a number of services operated by the services provider of the CATV system 100 which may include data associated with a given customer. For example, a billing system 162 may include information such as a customer's name, street address, business identification number, Social Security number, credit history, and information regarding services and products subscribed to by the customer. An authentication system 166 may include information such as secure usernames and passwords utilized by customers for access to network services. The customer information database 168 may include general information about customers such as place of employment, business address, business telephone number and demographic information such as age, gender, educational level, and the like. As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols.

An electronic mail system 164 is illustrated for providing electronic mail services to customers of the CATV system 100 according to embodiments of the present invention. As should be understood by those skilled in the art, the electronic mail system 164 may comprise a general purpose computing system operative to receive and maintain electronic mail messages directed to one or more customers of the cable services system 100. The electronic mail system 164 may contain information such as electronic mail addresses, high-speed Internet access subscription information and electronic mail usage data. According to embodiments of the present invention, after a given customer is properly authenticated for authorized access to electronic mail data contained in the electronic mail system 164, a customer may select received electronic mail messages for viewing, deletion or other disposition. Electronic mail services requests, including mail viewing requests, mail deletion requests, and the like, are passed by a customer through the client side set-top box 105 through the HFC network 115 to the application server 140. The application server 140 passes electronic mail requests to the electronic mail system 164. Electronic mail message header information and associated text is passed from the electronic mail system 164 back to the application server 140. The application server 140 via the middleware 142 builds an appropriate display page for displaying electronic mail information to a customer. The display page built by the application server 140 is passed to the set-top box 105 for display to the customer via the customer's television display screen 120.

The lightweight directory access protocol (LDAP) database 175 is illustrative of a database for maintaining a variety of customer information. According to embodiments of the present invention, in addition to other customer information, the LDAP database 175 may store customer usernames, passwords and associated personal identification numbers (PINs) for accessing the electronic mail system 164. As understood by those skilled in the art, a username may be entered into the LDAP database for a number of users for any given client side set-top box. For example, in a given household, a number of users of the set-top box 105 may maintain separate usernames in the LDAP server database. Likewise, each of the users may enter a password and personal identification number associated with their respective usernames for storage in the LDAP server database. Accordingly, when a given user desires access to his or her electronic mail messages according to embodiments of the present invention, that user's personal identification number may be utilized by the application server 140, as described below, to authenticate the user's access to electronic mail services by comparing a username and personal identification number entered by the user upon an attempted login to information (username, password, PIN) stored in the LDAP database 175.

Referring still to FIG. 1, a web services system 150 is illustrated between the application server 140 and the other computing and data systems such as the data services 160 and the LDAP database 175. According to embodiments of the present invention, the web services system 150 serves as a collection point for data requested from each of these disparate computing and data systems. When the application server 140 needs to exchange data to and from any of these systems, the application server 140 passes a data query to the web services system 150. The web services system formulates a data query to each of the available data services systems for obtaining any available data for a given customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. According to embodiments of the present invention, the web services system 150 is operative to pass authentication credentials to the LDAP database 175 for obtaining user passwords and for updating electronic mail services personal identification numbers.

The computer 180 is illustrative of a general purpose computing system such as a personal computer, laptop, hand-held computing device and the like that may be utilized by a customer for accessing the head-end functionality of the cable services network for providing customer data to components of the cable services network or for updating or otherwise maintaining data stored by the cable services network. For example, according to embodiments of the present invention, a customer may logon to an Internet-based website operated by the cable services network 100 via the user's computer 180 to provide customer information such as customer username, password and personal identification number so that the user may subsequently gain access to her electronic mail messages via her television 120 and set-top box 105. For example, a given customer may enter a new personal identification number through her computer 180 via an Internet-based webpage operated by the cable services network 100 which may, in turn, utilize information input by the customer to update data maintained on the customer at the LDAP database 175.

Figure 2:
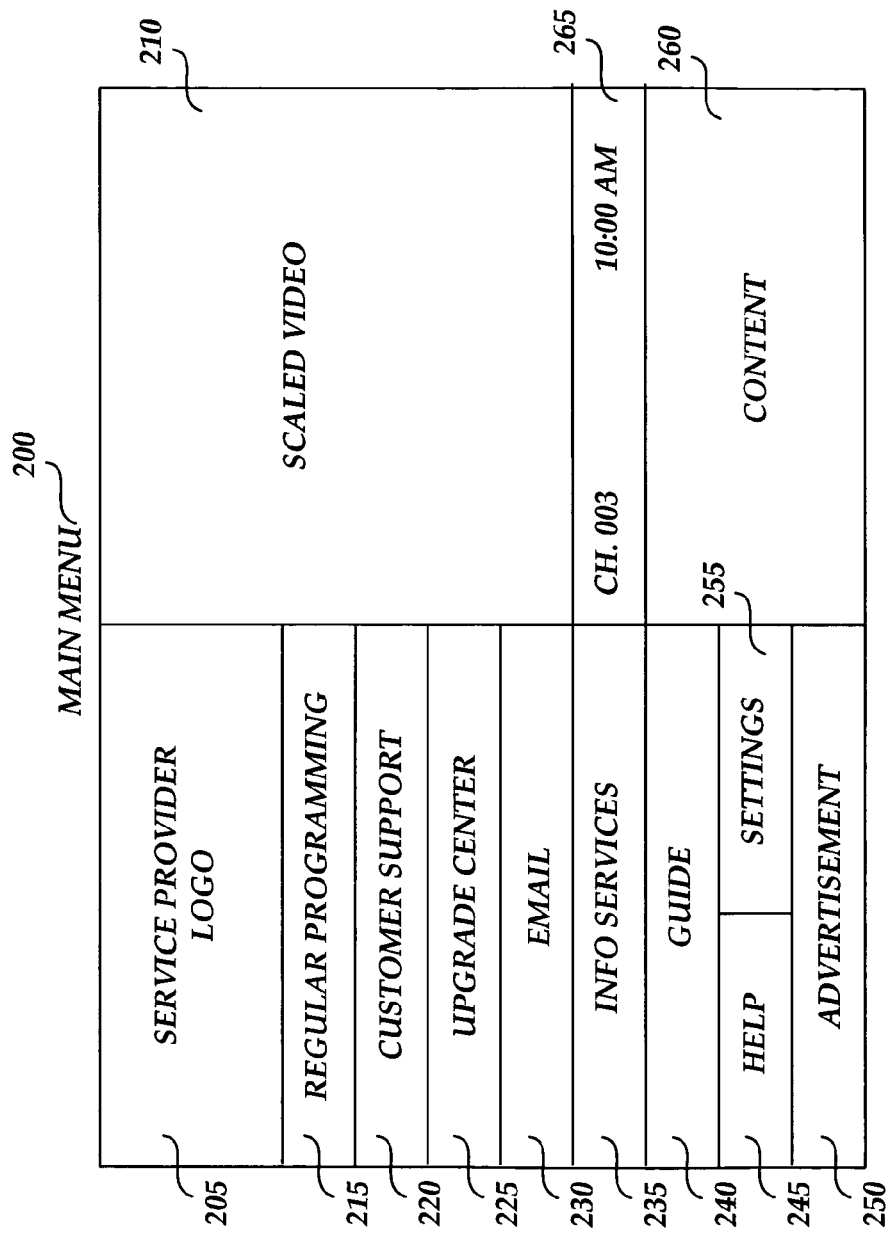
FIG. 2 is a simplified block diagram illustrating a television screen display of an interactive television services main menu according to embodiments of the present invention.

FIG. 2 is a simplified block diagram illustrating a television screen display of an interactive television services main menu according to embodiments of the present invention. Referring to FIG. 2, a client application 125 operating on the set-top box 105 may cause the presentation of a variety of menus that are displayed to the customer on the customer television 120. For example, the main menu 200 illustrated in FIG. 2 is representative of a first or main menu from which a customer may select other services provided by the customer's cable television services provider, or through which the customer may be provided targeted advertising and/or information content. As should be understood, the layout and content illustrated in FIG. 2 is for purposes of example only and is not limiting of the variety of different layouts and types of content that may be included in such a menu according to embodiments of the present invention.

The main menu television screen display 200 includes a service provider logo area 205 in the upper left-hand corner where the service provider may include their name, trademark or other identifying logo. A number of selectable buttons are provided with which the customer may select functionality from the main menu using the customer's remote control 128. For example, a regular programming button 215 is illustrated for allowing the user to dismiss the main menu screen and return to regular full-screen video programming. A customer support button 220 is provided for allowing the user to select a customer support application for obtaining information about services or products associated with the customer's cable television services subscription. An upgrade center button 225 is provided for allowing the user to launch a menu with which the user may upgrade or otherwise change subscribed services or products. An electronic mail button 230 is provided for allowing the user to launch an electronic mail session with which the user may review and dispose of electronic mail messages received via the electronic mail system 164. A guide button 240 is provided for allowing the subscriber to receive helpful information such as television listings, services and product offerings, and the like. A help button 245 is provided for allowing the user to obtain helpful information regarding utilization of subscribed services. A settings button 255 is provided for allowing a user to check and modify subscribed services settings. A scaled video pane 210 is illustrated in which video programming is displayed while the user is viewing other portions of the main menu display 200. For example, a television channel last viewed by the customer prior to selection of the main menu display 200 may be presented to the user in the scaled video pane 210 to prevent the user from missing desired portions of a video presentation.

An advertisement pane 250 provides a space for targeted advertisement directed to the customer. If no targeted advertisement content is available or appropriate, the advertisement pane 250 may be populated with a default advertisement that is not specific to the customer of the main menu 200. A content pane 260 is provided for displaying informational content to a customer. The content may be targeted to a specific customer based on customer profile data maintained for the customer in a customer profile. For example, weather information keyed to a customer's home address or ZIP code may be obtained from a third-party services system 146 and may be displayed in the content pane 260. If no customer profile data is available for a given customer, or if a default customer profile is prepared for a given customer, default content may be displayed to the customer in the content pane 260.

Operation

Figure 3A:
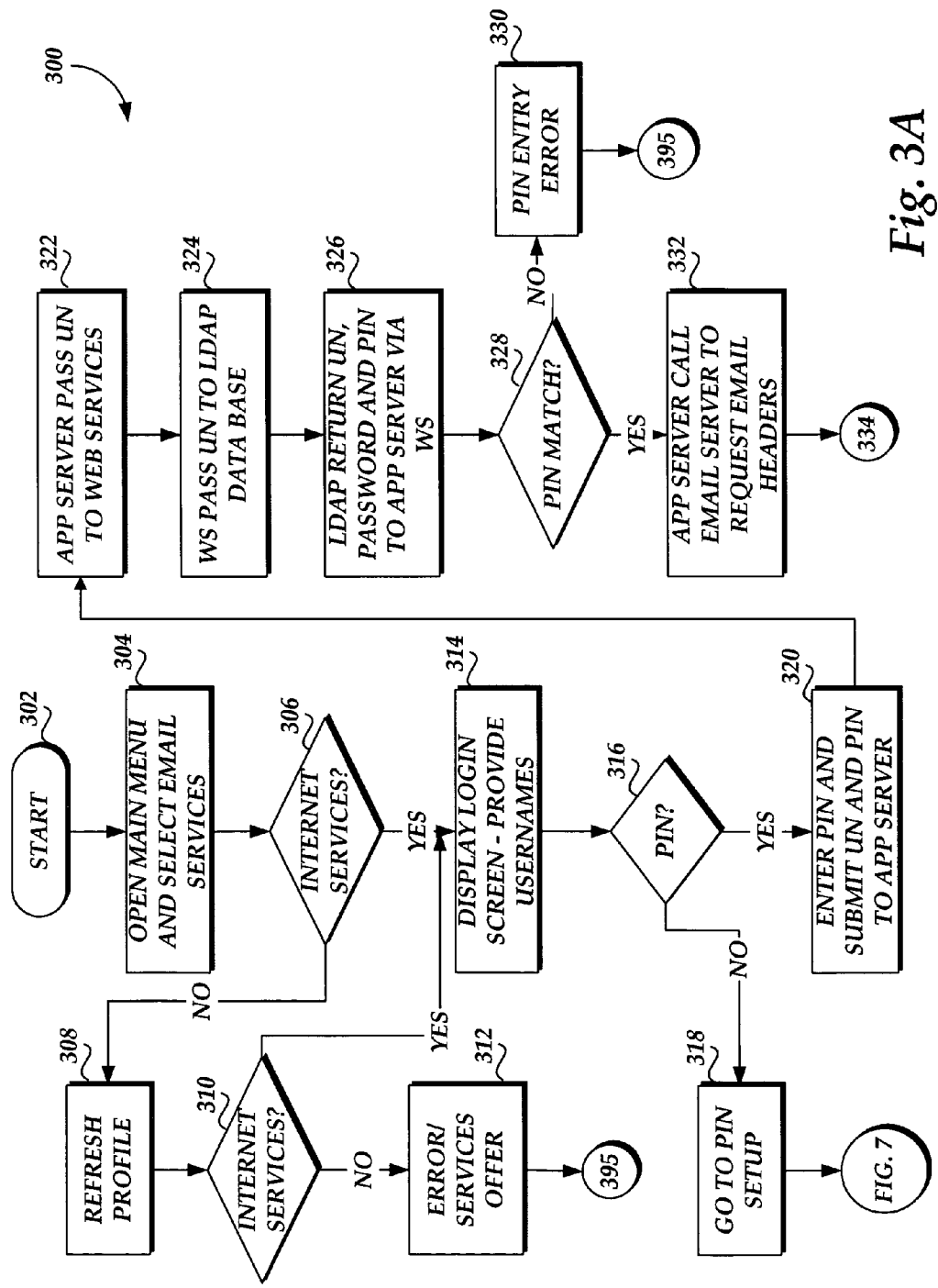

Having described an exemplary operating environment for embodiments of the present invention with reference to FIGS. 1 and 2, an improved method and system for accessing electronic mail services via an interactive television session in a cable services network will now be described. FIGS. 3A and 3B are flow diagrams showing an illustrative routine for accessing an electronic mail system 164 via a cable services network 100 according to embodiments of the present invention. The method 300 begins at start block 302 and proceeds to block 304 where a customer desiring to view or delete his/her electronic mail messages via an interactive television session launches the main menu 200 described above with reference to FIG. 2. According to embodiments of the present invention, the customer uses his remote control device 128 to navigate to a channel provided by his cable services provider on which the customer may selectively initiate an interactive television session. Once the main menu 200 is displayed on the customer's television screen 120, the customer may select from a variety of functionality provided by his services provider, as described above with reference to FIG. 2. According to embodiments of the present invention, because the customer desires to view or delete received electronic mail messages via an interactive television session, the customer selects the email button 230 using his remote control device 128.

At block 306, in response to selection of the email button 230, a determination is made at the customer's set-top box 105 as to whether the customer's account is provisioned for electronic mail services. For example, it may be a requirement for receiving, viewing or otherwise disposing of electronic mail messages via an interactive television session that the customer be a subscriber to high-speed Internet services or other electronic mail services provided by his cable services provider. According to embodiments of the present invention, the determination of whether the customer is a subscriber to the required services is accomplished at the set-top box by reviewing a customer data profile maintained on the customer at the set-top box 105. The customer data profile includes a variety of information about the customer such as personal data on the customer and information regarding services subscribed to by the customer. Accordingly, at block 306, the customer data profile is reviewed to determine whether the customer is a subscriber to services required for completing the electronic mail services request made by the customer. For a detailed description of preparation and utilization of customer data profiles according to embodiments of the present invention, see United States Patent Application entitled "Preparation and Utilization of Customer Profile Data in a Cable Services Network," Ser. No. 10/885,292, which is incorporated herein by reference as if fully set out herein.

If a review of the customer data profile results in a determination that the customer is not a subscriber to the required services, the routine proceeds to block 308 and the customer data profile is refreshed. The set-top box 105 queries the application server 140 via the HFC network 115 to obtain an updated customer data profile for the customer to determine whether the customer has subscribed to the required services since the last update of the customer data profile. At block 310, a review of the refreshed customer data profile is performed at the set-top box 105 to determine whether the customer has subscribed to the required services. If review of the refreshed or updated customer data profile results in a determination that the customer has not subscribed to the required services, the routine proceeds to block 312, and an error message or services offer may be displayed to the customer on the customer's television screen 120.

Figure 9:
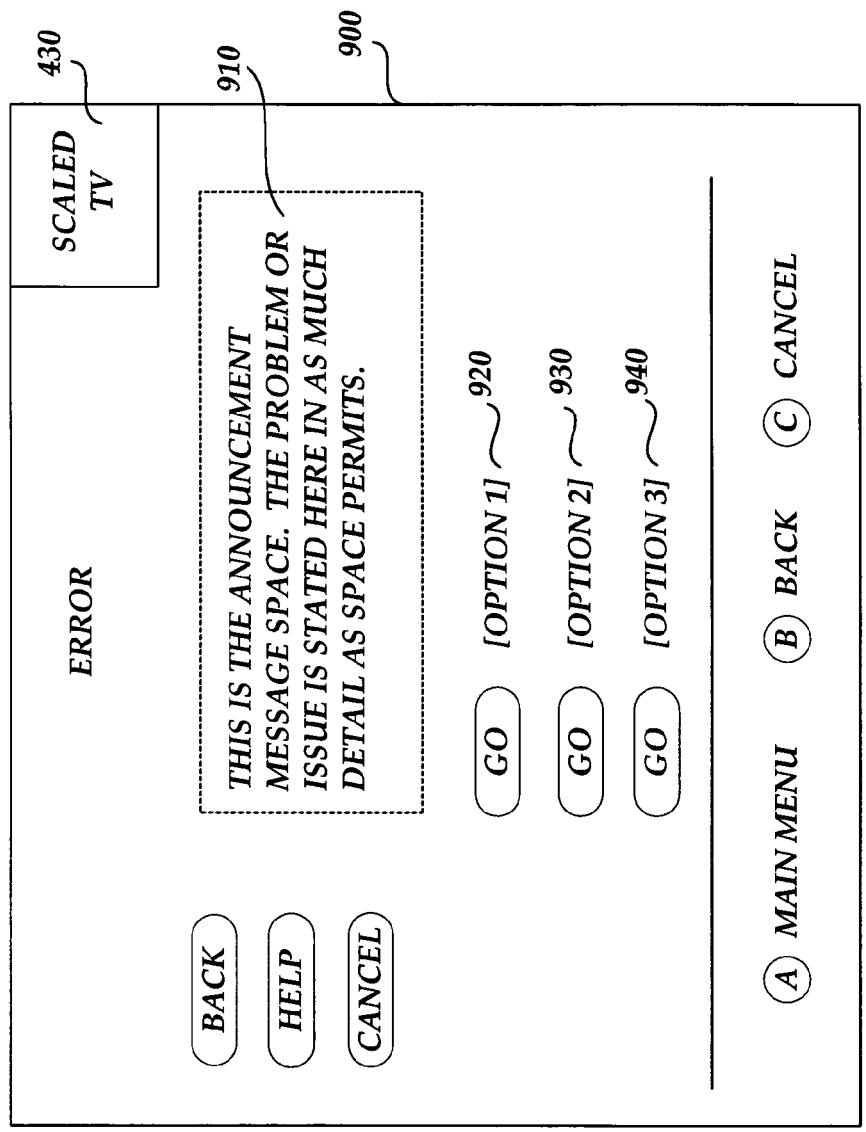
FIG. 9 is a simplified block diagram illustrating a television screen display of an error page.

As shown in FIG. 9, an error display 900 may be presented to the customer alerting the customer that an error has occurred as a result of the customer's electronic mail services request. The error display 900 includes an error message box 910 in which a message may be provided to the customer to alert the customer of the nature of the problem. For example, according to embodiments of the present invention, the error message may read: "You have not subscribed to required services for the provision of electronic mail services. Please see your cable services provider." Beneath the error message box 910, a number of options 920, 930, 940 may be provided to the customer to allow the customer to navigate out of the error condition. For example, an option 920 may allow the customer to return to the main menu 200. An option 930 may allow the customer to retry the attempted services request. According to embodiments of the present invention, if the customer returns to the main menu 200, an advertisement may be provided to the customer by the customer's cable services provider in the advertisement pane 250 regarding the services required by the customer to allow the customer to receive the desired electronic mail services.

Figure 4:
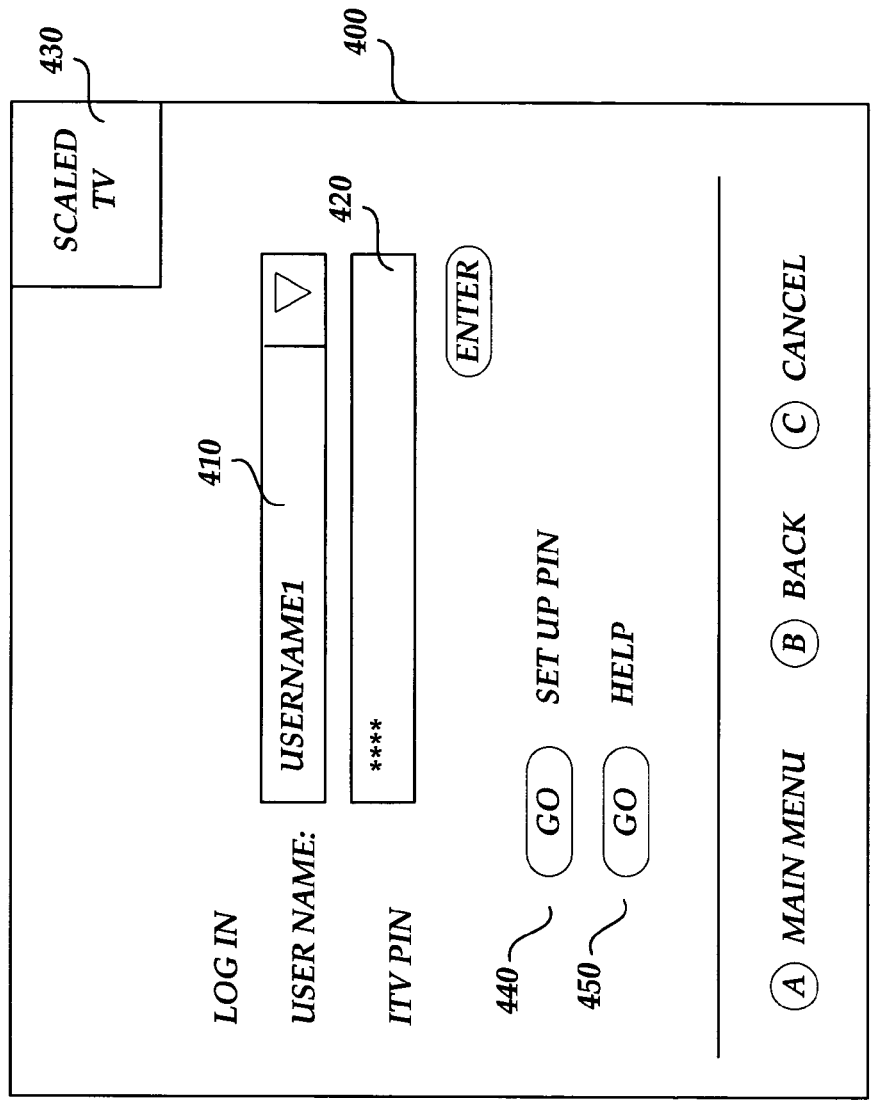
FIG. 4 is a simplified block diagram illustrating a television screen display of an electronic mail login page.

Referring back to FIG. 3, if a determination is made at the set-top box 105, after a review of the customer data profile, that the customer is a subscriber to required services to allow the customer to receive, view or otherwise dispose of electronic mail messages via an interactive television session, the routing proceeds to block 314. At block 314, the electronic mail application 125 at the set-top box 105 displays the electronic mail services login page 400, illustrated in FIG. 4, onto the customer's television screen 120. The login display 400 presented to the customer in response to selection of the email button 230 includes a username text box 410 and an interactive television PIN text box 420. A scaled video pane 430 is provided for allowing the customer to continue to view a desired television program while the customer is logging in to electronic mail services. As should be understood by those skilled in the art, the layout and functionality illustrated in FIG. 4 is for purposes of example only and are not restrictive of a variety of different layouts and functionality sets that may be included in an electronic mail services login display 400.

The username text box 410 may be automatically populated by the set-top box 105 with all usernames associated with the customer. For example, the customer may comprise a household having a number of adults, children, friends, associates, relatives and the like of the subscribing customer. The customer data profile maintained at the set-top box 105, described above, may contain a username for each person who may have access to electronic mail services and who has established a username with the cable services provider. Accordingly, a given user of the customer subscribed services may locate his particular username for accessing electronic mail services by scrolling through one or more usernames populated in the username text box 410 by the set-top box 105 from usernames contained in the customer data profile. According to embodiments of the present invention, the interactive television PIN text box 420 allows for entry of a personal identification number by a given electronic mail services user. After selection of a username from the username text box 410, the user may navigate to the interactive television PIN text box 420 using the remote control device 128 and enter a personal identification number using the number keys on the remote control device. Once the user has selected a username and has entered a PIN, the user may submit the username and PIN for access to electronic mail services.

Referring back to FIGS. 3A and 3B, if the user does not have an established personal identification number, the routine proceeds to block 318, and the user is allowed to establish a personal identification number for accessing electronic mail services or any other service provided by the cable services provider requiring a personal identification number. Setup of a personal identification number is described below with reference to FIGS. 7 and 8. If the user does have an established personal identification number, the routine proceeds to block 320, and the username and personal identification number selected and entered by the customer are submitted by the user. Submission of the username and personal identification number is performed by the set-top box 105, which submits the information to the application server 140 via the HFC network 115.

At block 322, the application server 140 receives the username and PIN selected and entered by the user, and the application server stores both the username and PIN for subsequent use. The application server then passes the username selected by the customer to the web services system 150 to request a password for the requesting user. Alternatively, both the username and the PIN may be passed to the web services system. According to embodiments of the present invention, a username and password are required by the electronic mail system 164 to allow electronic mail data from the electronic mail system 164 to be accessed by a given user. Accordingly, in order for the application server 140 to access the electronic mail system 164 on behalf of the requesting user, the application server 140 requires both the username submitted by the customer and a password for the user.

At block 324, the web services system 150 creates a database query containing the username received from the application server 140 as a database query property. The web services system 150 passes the database query to the LDAP database 175 to request a return of a username, password and personal identification number from the LDAP server database 175 associated with the username passed to the LDAP database 175 from the web services system 150. At block 326, the LDAP database 175 performs a database lookup using the username from the web services system 150. If the LDAP database 175 locates a data record associated with the username received from the web services system 150, the LDAP database 175 populates a responsive message containing a username, password and personal identification number associated with the username received from the web services system 150. The LDAP database 175 passes the responsive message back to the web services system 150, and the web services system 150, in turn, passes the data back to the application server 140.

At block 328, the application server 140 compares the personal identification number received from the LDAP database 175 with the personal identification number entered by the customer at block 310. If the personal identification number received from the LDAP database 175 does not match the personal identification number entered by the customer, the routine proceeds to block 330, and a PIN entry error condition results. According to an embodiment of the present invention, an error display 900, illustrated in FIG. 9, may be presented to the customer on the customer television screen 120 to alert the customer that the personal identification number entered by the customer is an invalid, incorrect or otherwise inappropriate personal identification number. In response, the user may be directed to return back to the login display 400 to re-enter the user's personal identification number, or the user may be directed to a separate display (described below with respect to FIG. 8) to allow the user to enter a new personal identification number.

If at block 328, a determination is made by the application server 140 that the personal identification number received from the LDAP database 175 does match the personal identification number entered by the customer, the routine proceeds to block 322. At block 322, the application server 140 calls the electronic mail system 164 to request electronic mail headers for electronic mail messages received by the customer. The application server 140 passes the username selected by the user and the password returned by the LDAP database 175 to request electronic mail header information. At block 334, email header information for electronic mail messages received by the customer are returned by the electronic mail system 164 to the application server 140. According to embodiments of the present invention, the full text of electronic mail messages is not passed to the application server 140 at this time. Only header information is passed to the application server 140 to conserve memory allocation and bandwidth.

Figure 5:
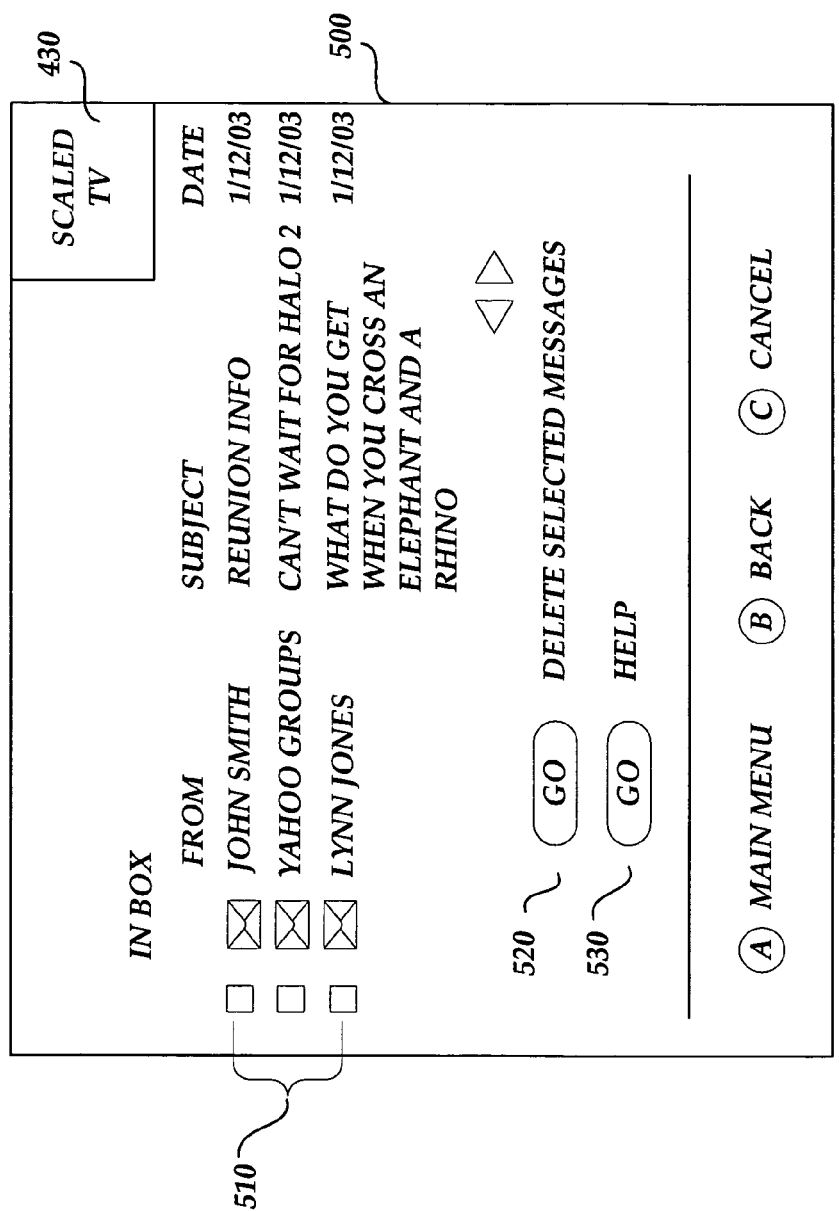
FIG. 5 is a simplified block diagram illustrating a television screen display of an electronic mail inbox page.

At block 336, the application server 140 builds an inbox display 500, illustrated in FIG. 5, with the electronic mail header information received from the electronic mail system 164. The electronic mail inbox display 500 includes a listing of electronic mail messages 510 received by the customer, a scaled video pane 430, and additional functionality buttons 520, 530. According to embodiments of the present invention, the electronic mail messages may be sorted according to a variety of sorting properties such as age of the messages, date of receipt of the messages, alphabetical sorting, and the like. As will be described below, the customer may select a given electronic mail message from the list of electronic mail messages for viewing on the customer's television display screen 120. Similarly, the customer may select one or more of the listed electronic mail messages to be deleted from the customer's electronic mail system account.

Referring back to FIGS. 3A and 3B, at block 338, the application server 140 passes the inbox display to the set-top box 105 via the HFC network 115, and the set-top box 105 displays the inbox display 500 onto the customer's television display screen 120. As should be appreciated by those skilled in the art, the inbox display 500 may be built by a client application 125 at the set-top box 105 on the client side of the cable services network 100. According to this alternative embodiment, the application server 140 passes electronic mail header information received from the electronic mail system 164 to the set-top box 105 and client electronic mail application 125 which, in turn, builds the inbox display 500 for display to the television display screen 120 by the set-top box 105.

At block 340, a determination is made as to whether the user desires to view a selected electronic mail message or to delete one or more selected electronic mail messages. If the user desires to view a selected electronic mail message, the user may navigate to the desired electronic mail message using the remote control device 128 followed by selection of the desired electronic mail message. As should be appreciated, one or more keys on the remote control device 128 may be defined for selection of a given electronic mail message for requesting a viewing the full text of the selected electronic mail message. At block 346, in response to selection of one of the displayed electronic mail message headers, a view request is passed by the set-top box 105 to the application server 140 via the HFC network 115.

At block 348, according to embodiments of the present invention, the application server 140 re-authenticates the user's access to the electronic mail system before obtaining the full text of a selected electronic mail message. As described above with reference to blocks 332 through 328, the application server 140 passes the username to the LDAP database 175 via the web services system 150. The LDAP database 175 returns a username, password, and PIN associated with the received username. If the PIN received from the LDAP database 175 matches the PIN stored by the application server 140 for the customer, then the password for the customer received from the LDAP database 175 is utilized by the application server 140 to request electronic mail message text from the electronic mail system 164. Alternatively, no additional authentication may be required and the view request may be processed immediately upon selection of a desired electronic mail message as described below.

At block 350, the application server 140 requests the full electronic mail message text for the selected electronic mail message from the email system 164 using the customer username and password. The email system 164 returns the electronic mail text associated with the selected electronic mail message to the application server 140. At block 352, the electronic mail text received by the application server 140 is used to build an electronic mail message display 600, illustrated in FIG. 6. According to one embodiment, the application server 140 may build the electronic mail display 600 and pass the display to the set-top box 105 for presentation on the customer's television screen 120. Alternatively, the application server 140 may pass data associated with the electronic mail message text to the set-top box 105, and a client side electronic mail application 125 may build the electronic mail message display 600 for presentation on the customer's television display screen 120.

Figure 6:
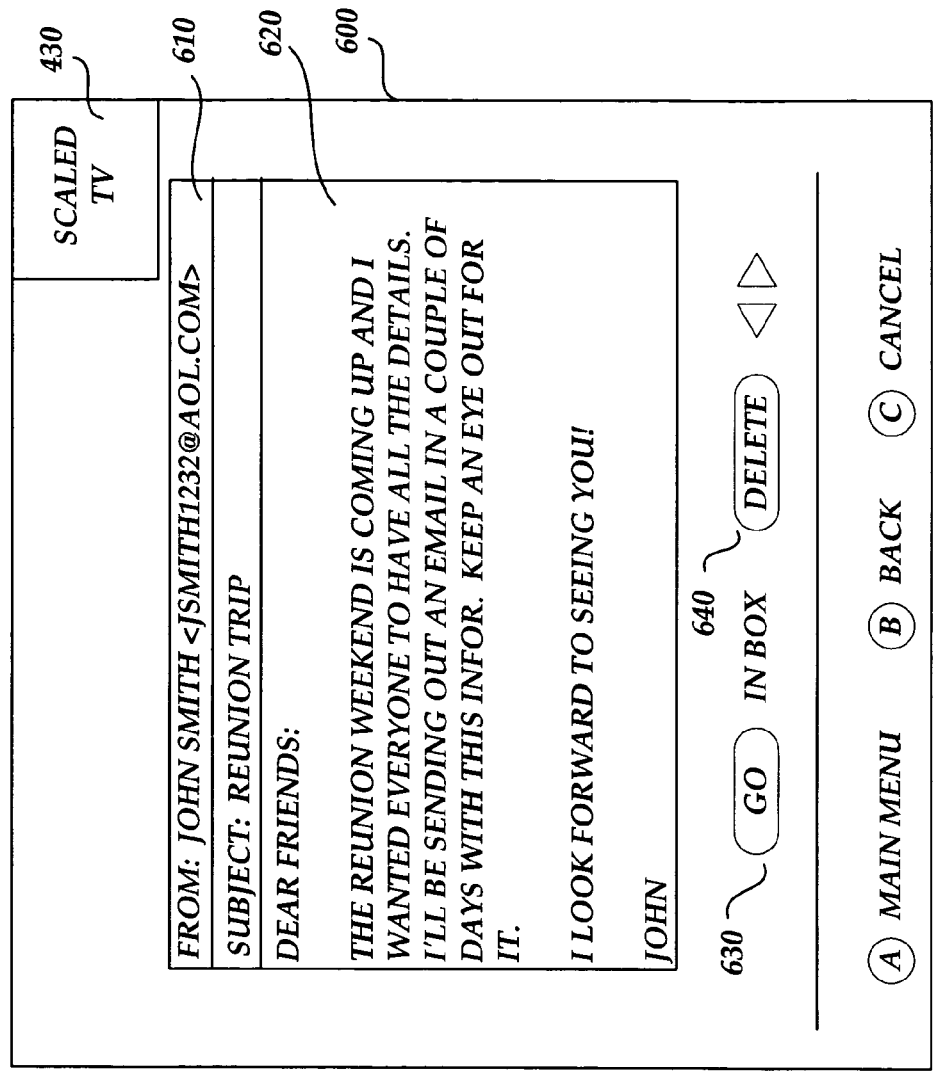
FIG. 6 is a simplified block diagram illustrating a television screen display of a selected electronic mail message header and associated text.

Referring to FIG. 6, the electronic mail message display 600 includes an electronic mail message user interface 620 for displaying the full text of the selected electronic mail message. A header field 610 is provided for displaying header information such as an identification of the email sender, the subject of the email message, the date and time of receipt of the email message, and the like. Additional functionality buttons 630, 640 are provided for allowing the user to navigate to other provided functionalities. For example, the inbox button 630 allows the user to navigate back to the inbox display 500 to review or delete other electronic mail messages. The delete button 640 allows the user to delete the presently displayed electronic mail message from the user's electronic mail system account.

Referring back to FIGS. 3A and 3B, if the user selects the presently displayed electronic mail message for deletion, or if the user selects one or more electronic mail messages from the inbox display 500 for deletion, the routine proceeds back to block 342 where delete operations are performed. If a given electronic mail message is selected for deletion, a delete request is passed by the set-top box 105 to the application server 140 via the HFC network 115. According to embodiments of the present invention, the application server 140 may re-authenticate the user's authorization to access information contained in the electronic mail system 164. If the customer's access to the electronic mail system 164 is authenticated, as described herein, the application server 140 passes a delete selected electronic mail message request to the electronic mail system 164 along with the username and password of the customer. Once the electronic mail system 164 receives the authorized email deletion request, the selected electronic mail message is deleted from the user's electronic mail account.

After the electronic mail system 164 deletes the selected electronic mail message, a return message is passed back to the application server 140. In response, the application server 140 builds a new electronic mail inbox display 500 reflecting the deleted electronic mail message and passes the newly built electronic mail inbox display 500 to the set-top box 105 for presentation on the user's television display screen 120. Alternatively, the application server 140 may pass information reflecting the deleted electronic mail message to the set-top box 105, and the client side electronic mail application 125 may build an updated electronic mail inbox display 500 for presentation on the customer's television display screen 120. After the user has selected all desired electronic mail messages for viewing, deletion, or other disposition, the customer may return to television programming in progress prior to initiation of the interactive television session, or the user may return to the main menu 200 to select other interactive television functionality. The routine ends at block 395.

Figure 7:
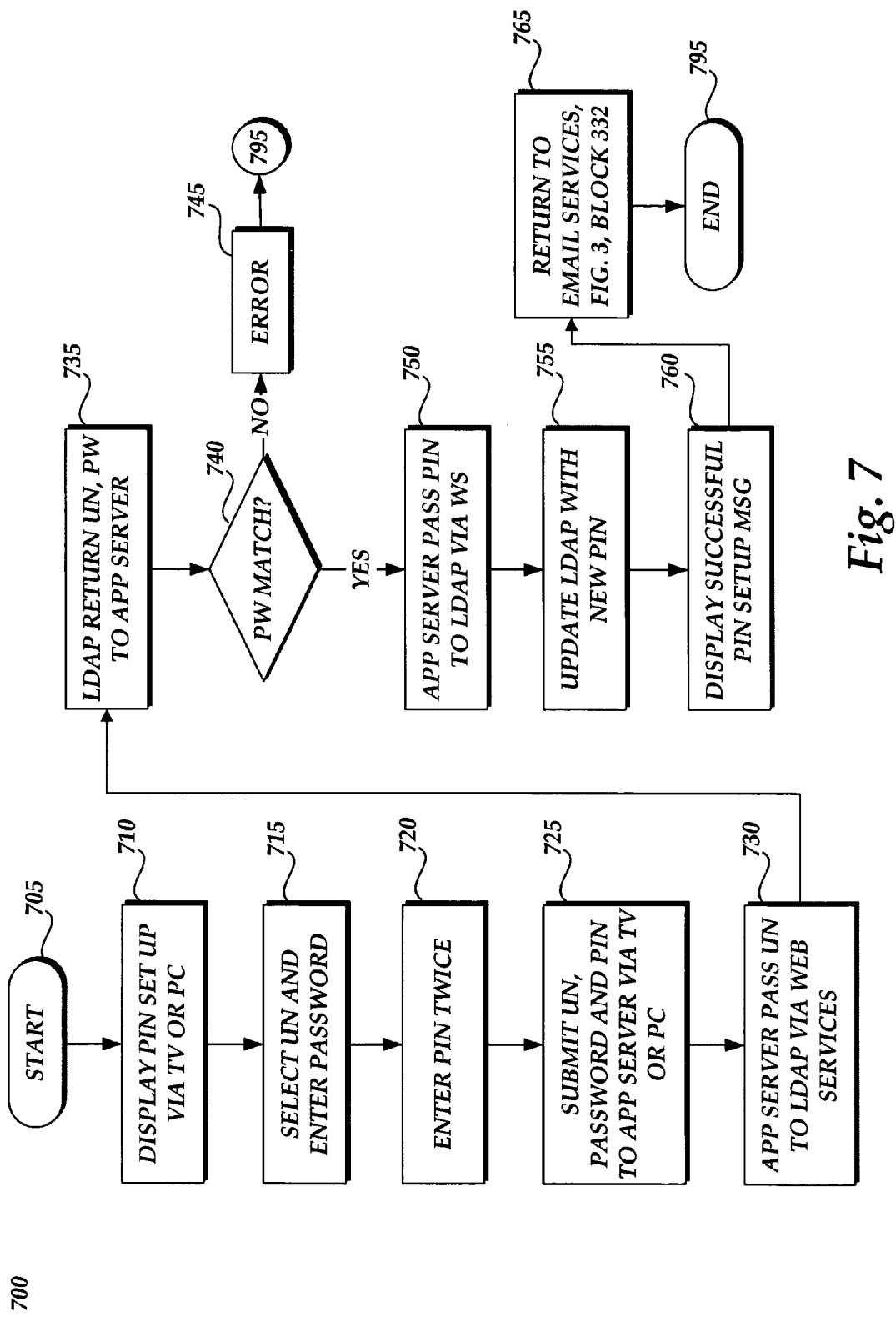
FIG. 7 is a flow diagram illustrating an illustrative routine for submitting a new personal identification number according to embodiments of the present invention.
Figure 8:
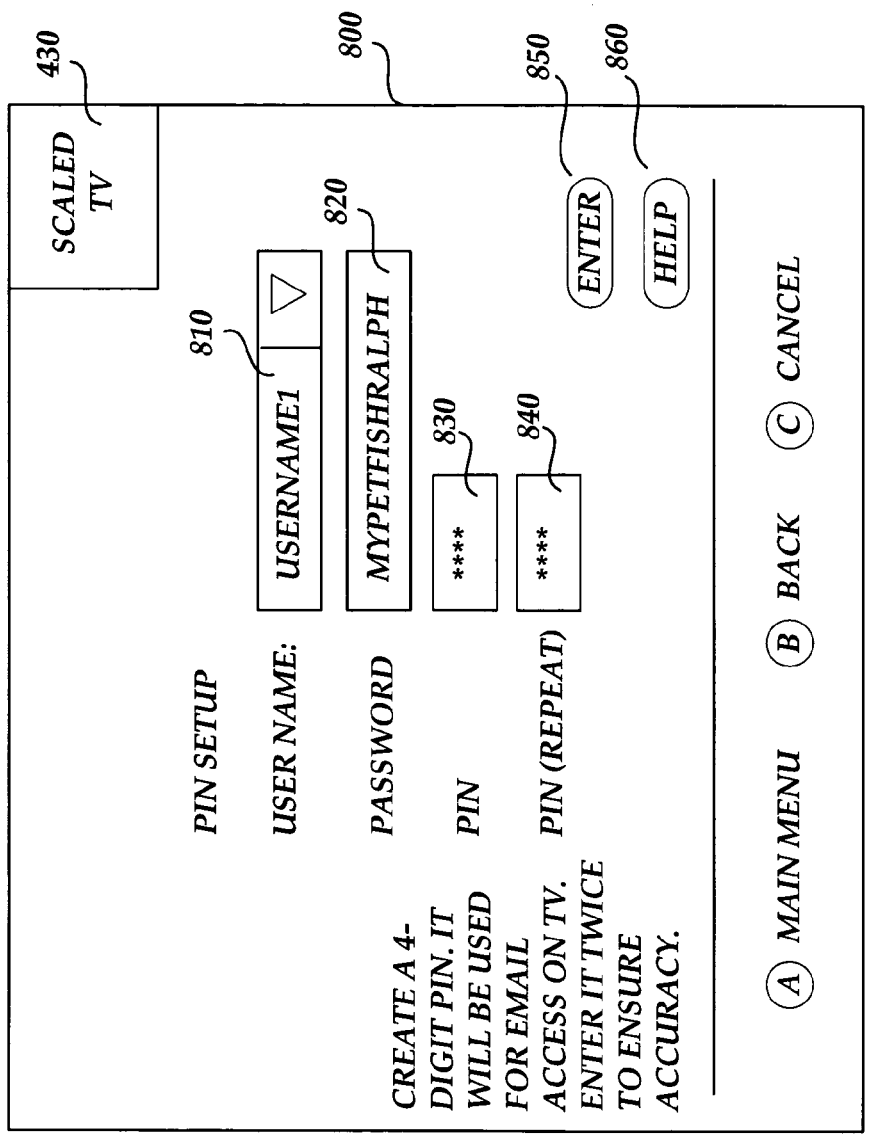
FIG. 8 is a simplified block diagram illustrating a television screen display of a personal identification number setup page.

Referring back to blocks 316 and 318 of FIGS. 3A and 3B, if the user has not previously established a personal identification number (PIN), or if the user desires to enter a new personal identification number, the user may establish or change his/her PIN through an interactive television session via the set-top box 105 or by contacting the cable services provider from the user's computer 180 via an Internet-based webpage operated by the cable services provider. FIG. 7 is a flow diagram illustrating an illustrative routine for submitting a new personal identification number according to embodiments of the present invention. The routine 700 begins at start block 705 and proceeds to block 710 where the personal identification number setup display 800, illustrated in FIG. 8, is presented to the customer. According to embodiments of the present invention, the personal identification number setup display may be presented on the customer's television screen 120 after the user has been denied access to electronic mail services for want of a personal identification number, or after the user has selected to navigate to a PIN setup display 800. Alternatively, the user may access an Internet-based webpage operated by her cable services provider via the user's computer 180, and the PIN setup display 800 may be presented to the user via the Internet-based webpage.

Referring to FIG. 8, the PIN setup display 800 includes a username field 810 for selecting a username associated with the requesting customer/user. As described with reference to FIG. 3, the usernames available in the username field 810 may be pre-populated by the set-top box 105 from the customer data profile associated with the subscribing customer of the set-top box 105. A password entry field 820 is provided for allowing the user to enter a password associated with the selected username. According to one embodiment, selection of the password entry field 820 causes a soft keyboard (not shown) to be displayed in the PIN setup display 800. The user may enter a desired password by navigating and selecting desired alpha/numeric keys of the soft keyboard. Alternatively, a password previously entered by the user may be stored by the set-top box 105 in association with the selected username and may be automatically populated into the password entry field. A PIN entry field 830 and a PIN repeat entry field 840 are provided for allowing the user to enter a desired personal identification number once followed by a second entry of the same personal identification number to verify the accuracy of the PIN input. As should be understood by those skilled in the art, the desired PIN may be entered into the PIN entry fields 830, 840 using a soft keyboard, or using the numeric keys of the user's remote control device 128. "Enter" and "Help" functionality keys 850 and 860 are provided for allowing the user to submit the desired personal identification number and to allow the user to obtain helpful information.

Referring back to FIG. 7, at block 715, the user selects an appropriate username from the username field 810 and enters a password into the password field 820. After the user has selected a desired username and entered an associated password, the routine proceeds to block 720, and the user enters the desired personal identification number into the PIN entry field 830. The user then enters the same desired PIN number into the PIN entry repeat field 840 to verify accurate entry of the personal identification number. At block 725, the set-top box 105 passes the username, password and PIN to the application server 140 via the HFC network 115. Alternatively, if the user entered the username, password and PIN via the user's computer 180, the data is passed to the application server 140 via an Internet-based webpage operated through the Internet 144.

At block 730, the application server 140 stores the username, password and PIN received from the user. The application server then passes the received username to the LDAP database 175 via a database query from the web services system 150. At block 735, the LDAP database 175 performs a database lookup on the received username and returns a username and password associated with the received username back to the application server 140 via the web services system 150. At decision block 740, a determination is made by the application server 140 as to whether the username and password received from the LDAP database 175 matches the username and password received from the user via the set-top box 105 or via the user's computer 180. If the usernames and passwords do not match, the routine proceeds to block 745 and an error condition results.

At block 745, an error display 900, illustrated in FIG. 9, may be presented to the customer via the set-top box 105 at the customer's television display screen 120 or via an Internet-based webpage displayed at the user's computer 180. An appropriate error message may be provided to the user such as "The password you entered is incorrect, please enter your password again." A variety of options may be provided to the user to allow the user to return to the PIN setup display 800 for re-entry of the password, or to allow the user to return back to the main menu 200 to select other functionality. If the usernames and passwords received by the user match the usernames and passwords returned from the LDAP database 175, the routine proceeds to block 750.

At block 750, the application server 140 passes the personal identification number received from the user to the LDAP database 175 via a database query from the web services system 150. At block 755, the LDAP database 175 updates a database record maintained for the identified user with the new or updated PIN received from the application server 140. At block 760, the application server 140 may cause a "successful PIN setup" message to be displayed to the user at the user's computer 180 or at the user's television screen 120. As should be understood by those skilled in the art, the application server 140 may direct a client application 125 at the set-top box 105 to provide a "successful PIN setup" message to the customer via the user's television display screen 120, or alternatively, the application server may cause an appropriate "successful PIN setup" message webpage to be displayed to the user at the user's computer 180 via the Internet 144.

At block 765, once the user has successfully entered a new or updated personal identification number, the customer may be directed back to electronic mail services, such as described with reference to block 322, FIGS. 3A and 3B. That is, once the customer has successfully entered or updated his/her personal identification number, the user may now utilize the personal identification number for accessing electronic mail services, as described above with reference to FIGS. 3A and 3B. The routine ends at block 795.

As described herein, methods and systems are provided for improved access to electronic mail services via interactive television sessions through a cable services network. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of accessing electronic mail services via an interactive television session in a cable services network, comprising:

selecting a first username for accessing electronic mail services;

providing a first personal identification number (PIN) for accessing electronic mail services;

obtaining from a database of user information a password corresponding to the first username and the first PIN, the password for authorizing access to the electronic mail services; and submitting the password to an electronic mail system for accessing electronic mail services.

2. The method of claim 1, whereby obtaining from a database of user information a password corresponding to the username and the first PIN includes, querying a database of user information for a password corresponding to the first username;

returning from the database of user information a second username and the password; and if the second username returned from the database of user information matches the first username, designating the password returned from the database of user information as a valid password for authorizing access to the electronic mail services.

3. The method of claim 1, prior to selecting a first username for accessing electronic mail services, further comprising:

initiating an interactive television services session via a cable services network;

displaying a menu of interactive television services;

selecting provision of electronic mail services via the interactive television services session; and determining whether provision of electronic mail services via the electronic television services session is authorized.

4. The method of claim 3, whereby if provision of electronic mail services via the interactive television services session is not authorized, preventing provision of electronic mail services.

5. The method of claim 3, whereby if provision of electronic mail services via the interactive television services session is not authorized, offering provision of electronic mail services.

6. The method of claim 3, further comprising:
displaying an electronic mail services login display; and
automatically populating the login display with one or more usernames.

7. The method of claim 6, whereby selecting a first username for accessing electronic mail services includes selecting one of the one or more usernames automatically populated into the login display.

8. The method of claim 1, prior to obtaining from a database of user information a password corresponding to the first username and the first PIN, submitting the selected first username and the first PIN to an application server from a cable services set-top box.

9. The method of claim 8, whereby querying a database of user information for a password corresponding to the first username and the first PIN includes querying the database of user information from the application server via a web services system.

10. The method of claim 1, further comprising:
accessing the electronic mail services with the first username and the password.

11. The method of claim 10, whereby accessing the electronic mail services with the first username and the password includes:
passing the first username and the password to the electronic mail system from the application server via the web services system; and
requesting electronic mail messages data associated with the first username and the password.

12. The method of claim 11, whereby requesting electronic mail messages data associated with the first username and the password includes requesting electronic mail messages header information for electronic mail messages associated with the first username and the password.

13. The method of claim 12, further comprising:
displaying an electronic mail inbox containing the electronic mail messages header information for each of one or more electronic mail messages associated with the first username and the password.

14. The method of claim 13, further comprising:
displaying the electronic mail inbox on a television display screen via the interactive television services session.

15. The method of claim 13, further comprising:
prior to displaying an electronic mail inbox containing the electronic mail messages header information for each of one or more electronic mail messages associated with the first username and the password, receiving the electronic mail messages header information at an application server from the electronic mail system; and
building the electronic mail inbox at the application server and passing the electronic mail inbox from the application server to a cable services set-top box.

16. The method of claim 13, prior to displaying an electronic mail inbox containing the electronic mail messages header information for each of one or more electronic mail messages associated with the first username and the password, receiving the electronic mail messages header information at a cable services set-top box; and
building the electronic mail inbox at the cable services set-top box.

17. The method of claim 13, further comprising:
selecting an electronic mail message from the electronic mail inbox; and
querying the electronic mail system for electronic mail text associated with the selected electronic mail message.

18. The method of claim 17, prior to querying the electronic mail system for electronic mail text associated with the selected electronic mail message, authenticating access to the electronic mail system.

19. The method of claim 18, whereby querying the electronic mail system for electronic mail text associated with the selected electronic mail message includes querying the electronic mail system from the application server.

20. The method of claim 19, further comprising:
authenticating access to the electronic mail system includes verifying that the electronic mail system query is from a valid password corresponding to the first username.

21. The method of claim 17, further comprising:
returning the electronic mail text associated with the selected electronic mail message; and
displaying the returned electronic mail text associated with the selected electronic mail message.

22. The method of claim 21, whereby returning the electronic mail text associated with the selected electronic mail message includes returning the electronic mail text from the electronic mail system to the application server.

23. The method of claim 22, whereby displaying the returned electronic mail text associated with the selected electronic mail message includes displaying the electronic mail message text on a television display screen via the interactive television services session.

24. The method of claim 13, further comprising:
selecting an electronic mail message from the electronic mail inbox for deletion from the electronic mail system; and
causing the electronic mail system to delete the selected electronic mail message from the electronic mail system.

25. A method for creating a personal identification number in a cable services network via an interactive television services session, comprising:
displaying a personal identification number set-up page;
selecting a username;
entering a first password;
entering a personal identification number (PIN);
passing the username to a database of user information;
querying the database of user information for a second password corresponding to the username; and
if the second password matches the first password, updating the database of user information to associate the PIN with the username and the first and second passwords.

26. The method of claim 25, further comprising:
prior to passing the username to a database of user information, passing the username, the first password and the PIN from a cable services set-top box to an application server for storing the personal identification number; and whereby passing the username to a database of user information, includes passing the username from the application server to the database of user information via a web services system.

27. A system for accessing electronic mail services via an interactive television session in a cable services network, comprising:
a cable services set-top box operative
to receive a selected username for accessing electronic mail services;

to receive a selected personal identification number (PIN) for accessing electronic mail services;

to pass the selected username and the selected PIN to an application server for receiving electronic mail services;

the application server operative to pass the selected username to a web services system for obtaining a password for accessing electronic mail services;

the web services system operative to query a database of user information with the selected username to obtain the password for accessing electronic mail services;

the database of user information operative to return the password and a stored PIN associated with the selected username to the application server via the web services system; and the application server further operative to determine whether the stored PIN received from the database of user information matches the selected PIN, and if the stored PIN received from the database of user information does match the selected PIN, the application server being further operative to designate the password returned from the database of user information as a valid password for accessing electronic mail services.

28. The system of claim 27, whereby the application server is further operative to pass the selected username and the password to an electronic mail system for accessing electronic mail data associated with the selected username and the password, and whereby the application server is further operative to return the electronic mail data to the cable services set-top box for presentation to a requesting user.

29. The system of claim 28, whereby the application server is further operative to pass the selected username and the password to the electronic mail system for accessing electronic mail data associated with the selected username and the password, and whereby the application server is further operative to delete selected electronic mail data associated with the selected username and the password from the electronic mail system.

30. A web services system for facilitating electronic mail services via an interactive television session in a cable services network, comprising:

the web services system operative to receive a username associated with an electronic mail services user;

to query a database of user information with the username for obtaining a password associated with the electronic mail services user;

to receive a password for the electronic mail services user from the database; and to return the password for the electronic mail services user to an application server for authenticating access to an electronic mail services system by the electronic mail services user.

31. The web services system of claim 30, further operative to receive from the application server a personal identification number associated with the electronic mail services user; and to pass the personal identification number to the database of user information for adding the personal identification number to the database of user information in association with the electronic mail services user.

* * * * *

UNITED STATES PATENT AND TRADEMARK OFFICE
CERTIFICATE OF CORRECTION

| | | |
|---|---|---|
| PATENT NO. | : 7,669,218 B1 | |
| APPLICATION NO. | : 10/885295 | |
| DATED | : February 23, 2010 | |
| INVENTOR(S) | : Groff et al. | |

It is certified that error appears in the above-identified patent and that said Letters Patent is hereby corrected as shown below:

Col. 1, line 20: "Modem cable services" should read --Modern cable services--

Signed and Sealed this
Tenth Day of January, 2012

David J. Kappos
*Director of the United States Patent and Trademark Office*